E. T. JUERGENSON.
Medicated Neck-Bands for Children.
No. 153,439.          Patented July 28, 1874.
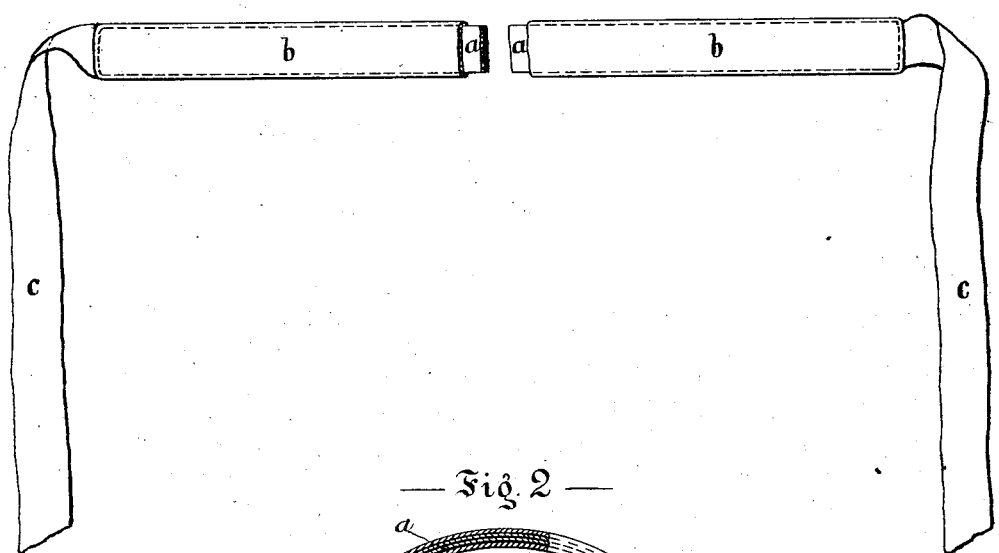
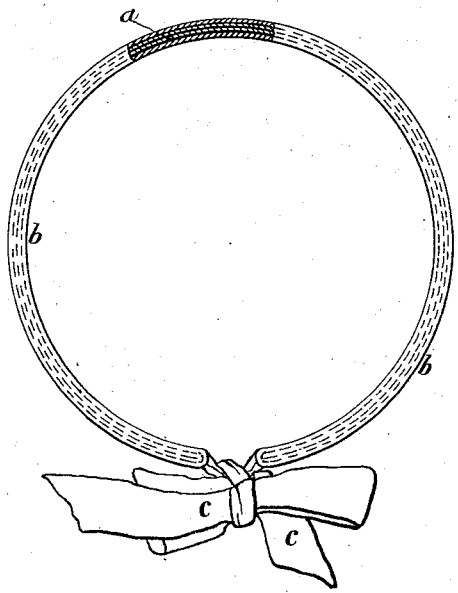
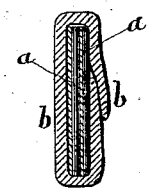
Witnesses:
Theodore Bergner
Chas. E. Pancoast
Inventor:
Ernst T. Juergenson

UNITED STATES PATENT OFFICE.

ERNST T. JUERGENSON, OF PHILADELPHIA, PENNSYLVANIA.

IMPROVEMENT IN MEDICATED NECK-BANDS FOR CHILDREN.

Specification forming part of Letters Patent No. 153,439, dated July 28, 1874; application filed July 9, 1874.

*To all whom it may concern:*

Be it known that I, ERNST T. JUERGENSON, of the city of Philadelphia, Pennsylvania, have invented an Odontogenic Neck-Band, of which the following is a specification:

The object of my invention is to exert a beneficial influence upon the health of infants during the teething period. Repeated experience has demonstrated that weak and delicate children were, by the use of this medicated neck-band, spared the many serious teething maladies and their sad consequences.

When the child shows the first symptoms of teething, one of these medicated neck-bands is tied around its neck, to be worn day and night. It exercises a strikingly beneficial effect upon the arteries and nerves, and the gums will be penetrated by the young teeth without difficulty; the action of the salivary glands becomes regular, and from the commencement to the close of this period, during which the entire infant organization undergoes a vast change, the intense pain from swelling of the gums, disorders of the digestive organs and bowels, and inflammation of the brain, may be averted by the efficacious influences of my improved neck-band.

The hygienic compound entering into the formation of these bands, consists of the following substances, mixed in about the proportions annexed: flowers of sulphur, forty-six parts; magnesia, six parts; pulverized amber, three parts; gum-camphor, pulverized, two parts; gum-arabic, three parts. To these ingredients, which, in their proportions, may, of course, vary, without defeating my object, I add enough gum-tragacanth, dissolved in water, to form a thick paste. This paste is spread upon one side of muslin or linen, to which it thoroughly adheres. The pieces thus prepared are cut in narrow strips, about three-eighths inch wide, and of sufficient length to extend around the neck of a child. I inclose one or several of these medicated strips in a covering of silk or velvet, preferably of a dark color, and to the ends attach suitable tie-ribbons or strings. The covered side of the medicated strips is indicated by the seam in the outer covering and worn next to the skin.

In the annexed drawing, Figure 1 is a full-size view of the neck-band, extended. Fig. 2 shows the manner of tying the band at the ends for wearing; and Fig. 3 is a cross-section of the band, drawn to an enlarged scale; *a a* are the medicated strips; *b* is the covering; and *c c* are the ties.

I claim as my invention—

A neck-band, medicated with the described compound, and arranged substantially in the manner and for the purpose set forth.

ERNST T. JUERGENSON.

Witnesses:
 THEODORE BERGNER,
 CHAS. E. PANCOAST.